United States Patent
Aboujaoude et al.

(10) Patent No.: US 7,356,376 B1
(45) Date of Patent: Apr. 8, 2008

(54) WORK WHEN READY LOAD BALANCING USING CRITICAL DATES

(75) Inventors: Roger Aboujaoude, Ocean Township, NJ (US); Hossein Eslambolchi, Los Altos Hills, CA (US); John McCanuel, Bailey, CO (US); Saeid Shariati, Basking Ridge, NJ (US)

(73) Assignee: AT&T Corp, New York, NY (US)

( * ) Notice: Subject to any disclaimer, the term of this patent is extended or adjusted under 35 U.S.C. 154(b) by 149 days.

(21) Appl. No.: 11/222,168

(22) Filed: Sep. 8, 2005

(51) Int. Cl.
*G06F 19/00* (2006.01)

(52) U.S. Cl. ...................................... 700/100; 700/101
(58) Field of Classification Search ................ 700/100, 700/101; 705/7, 8, 29
See application file for complete search history.

(56) References Cited

U.S. PATENT DOCUMENTS

| | | | |
|---|---|---|---|
| 5,040,123 A * | 8/1991 | Barber et al. ................ | 700/100 |
| 5,093,794 A * | 3/1992 | Howie et al. ................ | 700/100 |
| 5,233,533 A * | 8/1993 | Edstrom et al. ............ | 700/103 |
| 5,291,397 A * | 3/1994 | Powell ........................ | 700/97 |
| 5,432,887 A | 7/1995 | Khaw | |
| 5,809,479 A * | 9/1998 | Martin et al. ................. | 705/11 |
| 5,920,846 A | 7/1999 | Storch et al. | |
| 6,615,097 B2 | 9/2003 | Ozaki | |
| 6,684,213 B1 | 1/2004 | Schell et al. | |
| 6,711,449 B1 * | 3/2004 | Miyahara et al. ........... | 700/100 |
| 6,895,292 B2 | 5/2005 | Fromherz et al. | |
| 6,934,594 B2 * | 8/2005 | Loring et al. ................ | 700/100 |
| 7,212,976 B2 * | 5/2007 | Scheer .......................... | 705/1 |
| 2003/0202638 A1 * | 10/2003 | Eringis et al. ........... | 379/15.01 |
| 2006/0212323 A1 * | 9/2006 | Ninomiya ....................... | 705/7 |
| 2006/0277086 A1 * | 12/2006 | Ball et al. ..................... | 705/8 |

* cited by examiner

*Primary Examiner*—Leo Picard
*Assistant Examiner*—Carlos Ortiz-Rodriguez
(74) *Attorney, Agent, or Firm*—Hoffmann & Baron, LLP

(57) ABSTRACT

A method of balancing workload using critical dates and including the following steps: (a) assigning a promised delivery date to orders received from customers; (b) identifying one or more tasks associated with each of the orders; (c) assigning an expedited date or a customer requested date to each of the tasks of some of the orders; (d) determining a work start date for each of the one or more tasks in each of the orders; (e) assigning a first priority to tasks having a work start date D; (f) assigning a second priority to tasks scheduled to begin on day D+n and having the expedited date; (g) assigning a third priority to tasks scheduled to begin on day D+n and having the customer requested date; (h) setting n equal to a value of 1; (i) working on tasks during a work shift based on order of priority, wherein work on a lower priority task is not commenced until work on all tasks with higher priorities has been completed; (j) increasing n by an increment of 1; and (k) repeating steps (g), (h), (i), (j) and (k) until the work shift for day D has ended.

11 Claims, 1 Drawing Sheet

WORK WHEN READY LOAD BALANCING USING CRITICAL DATES

BACKGROUND OF INVENTION

This invention relates to scheduling work loads in order to evenly distribute the work and the available staff based on critical dates for completion.

In order to maintain a competitive position in industry, it is imperative for a company to efficiently and economically utilize its assets. This is especially important when the manufacturing and/or production process includes a series of interdependent sequential tasks, wherein the completion of one task is required before the next task can be started. Without proper scheduling coordination, workforce and material assets go unused, waiting for a preceding task to be completed. This type of inefficient scheduling invariably leads to delays and increased costs.

Many different schemes have been proposed for addressing the issues of efficient scheduling and maximization of workforce assets. Workcenters today often use one of two load distribution models: (1) "work when ready" or (2) "work when critical dates are met." "Work when ready" passes all the work to the next task when the previous task (or tasks) is completed. "Work when critical dates are met" passes the work to the next task when critical dates are met and when the previous task (or tasks) has been completed.

However, the existing methods of allocating resources do not recognize higher priority tasks and do not take into consideration client mandated completion dates. Accordingly, there is a need for a scheduling method which allocates work loads based on critical dates which include promised delivery dates, expedited dates and customer requested dates.

SUMMARY OF THE INVENTION

In accordance with the present invention, a method of balancing workload using critical dates is provided. The method includes the following steps: (a) assigning a promised delivery date to orders received from customers; (b) identifying one or more tasks associated with each of the orders; (c) assigning an expedited date or a customer requested date to each of the tasks of some of the orders; (d) determining a work start date for each of the one or more tasks in each of the orders; (e) assigning a first priority to tasks having a work start date D; (f) assigning a second priority to tasks scheduled to begin on day D+n and having the expedited date; (g) assigning a third priority to tasks scheduled to begin on day D+n and having the customer requested date; (h) setting n equal to a value of 1; (i) working on tasks during a work shift based on order of priority, wherein work on a lower priority task is not commenced until work on all tasks with higher priorities has been completed; (j) increasing n by an increment of 1; and (k) repeating steps (g), (h), (i), (j) and (k) until the work shift for day D has ended.

The method can also include identifying, after step (b), resources needed to perform the one or more tasks associated with each of the orders. A preferred embodiment includes the further step of determining, after the tasks having the expedited date are completed, if the resources are available to complete tasks with customer requested dates and stopping work if the resources are not available.

The promised delivery date is based on a predetermined schedule for each of the one or more tasks. The method of balancing workload further includes delivering the order on or before the promised delivery date, while delivering other orders based on expedited dates and customer requested dates. The expedited date represents that the customer agrees to pay an additional amount for delivery prior to the promised delivery date and the customer requested date represents that the customer is willing to accept delivery of the order prior to the promised delivery date.

The work start date is the date that work on each of the one or more tasks must be started in order for the order to be completed by the promised delivery date. The work start date is determined based on work schedule templates and the promised delivery date for each order. The first priority tasks have the highest priority, the second priority tasks have the second highest priority and the third priority tasks have the third highest priority.

The preferred embodiments of the method of balancing workload of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawing wherein.

DETAILED DESCRIPTION OF THE INVENTION

Figure 1:
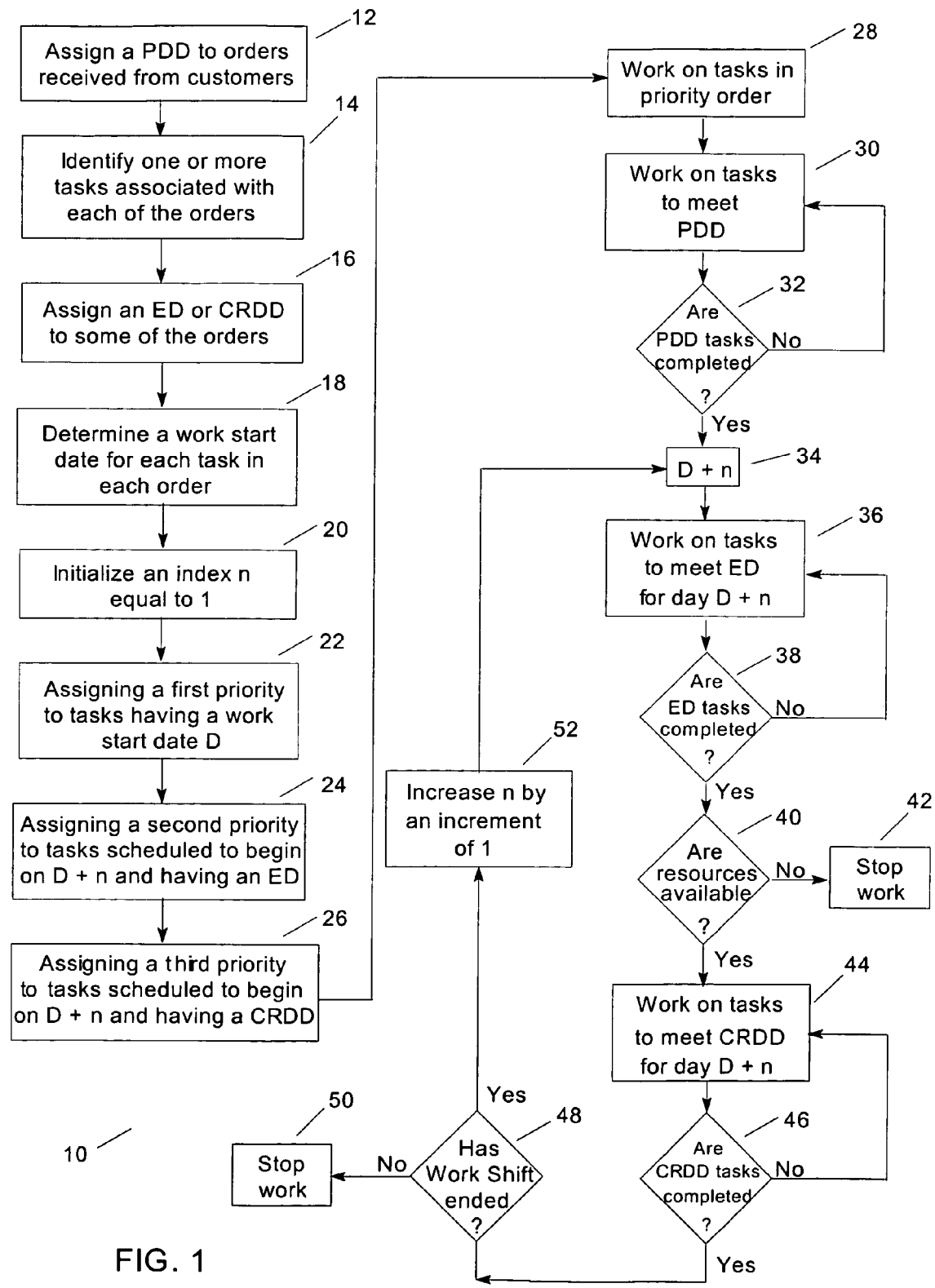
FIG. 1 is a flow chart showing the assignment of work tasks using the method of the present invention.

The present invention provides work load distribution for performing a complex sequence of tasks to complete an order for providing to a customer either a service or a product. In a preferred embodiment, the method is used in service assembly factories, for example provisioning a circuit in a telecommunications network. The resources needed can include work force and material assets and can vary for each order.

A service assembly factory is a sequence of many functions required to deliver a service to a customer. The final product can be access to a service such as frame relay or internet protocol (IP) and not physical goods. Assembling such a service requires connectivity of circuits and ports through a telecom company and its partner networks like the local exchange carriers (LECs). The telecom company as well as its partners have to coordinate and perform numerous tasks to deliver such a service on time. Because of the complexity of the service being assembled, the assembly process normally spans multiple workcenters that may not be geographically collocated and requires a large number of sequential tasks. A workcenter is defined as a location where one or more tasks necessary for completion of an order is performed. These tasks are not weighted equally on a time basis and, therefore, it is difficult to determine the exact staff requirements needed to deliver the workload for a particular day or any other specified time interval.

One way to efficiently distribute the workload is by the optimal allocation of labor and material resources to tasks that are critical and produce the highest profits. The present invention load balances work to balance/throttle load relative to existing staff and to avoid peaks and valleys in work load distribution. The present invention uses three (3) parameters to decide whether the work should be allowed to proceed to the next workcenter in the factory. In order of priority, these three parameters are:

Promised Delivery Date ("PDD"): This is a date that the order was promised to a customer based on a predetermined schedule of critical dates for the order being delivered. Using the date an order is received and the promised delivery date, work schedule templates assign start dates for each task required to complete an order. Tasks that are scheduled to start based on the promised delivery date of an order have the highest priority for a work shift in a workcenter.

Expedited Date ("ED"): This date uses expedited critical dates to reduce the end-to-end cycle time if the customer is willing to incur the cost of expediting the order. After a work shift in a workcenter completes all of the PDD tasks scheduled to start that day, priority is given to ED tasks that have a PDD scheduled start date of the next day or with the next work shift (i.e., day/shift D+1, where D is the PDD start date).

Customer Requested Delivery Date ("CRDD"): This is the earliest date that the customer is willing to accept delivery of the order if the company is able to deliver on this date. The customer will not pay an additional cost for the early delivery of the order, but the customer is willing to begin paying for the service that is provided. For example, if the order is for the connection of a customer to a telecom network, the customer is willing to pay for the telecom service on the day the order is delivered. After a work shift in a workcenter completes all of the PDD tasks scheduled to start that day and all of the ED tasks that have PDD scheduled start dates for the next day or with the next work shift (i.e., day/shift D+1, where D is the start date), priority is given to CRDD tasks that have PDD scheduled start dates for the next day or with the next work shift. In preferred embodiments of the invention, a determination is made as to whether resources are available before CRDD tasks are started.

After all of the ED tasks and CRDD tasks that have PDD scheduled start dates for the next day or with the next work shift have been completed, priority is given to ED tasks that have PDD scheduled start dates in two days (i.e., day/shift D+2, where D is the start date). If resources are available after the ED tasks for D+2 are completed, priority is given to CRDD tasks scheduled to start in two days. This procedure is reiterated for ED and CRDD tasks that have PDD scheduled start dates on days D+3, D+4, etc. until the work day or work shift has ended or resources have been exhausted. When an ED task or a CRDD task is completed earlier than the PDD scheduled work start date, the work template reschedules the remaining tasks in the order to benefit from the early completion of a proceeding task. In many cases, this allows the order to be completed on a date significantly earlier than the PDD.

Once an order is received in a factory, the load balancing method of the present invention creates intermediate critical dates for the completion of each task that must be performed based on the "promised delivery date." The method also creates a work start date for each of the tasks, which provides sufficient time to complete each task by its critical date. The intermediate critical dates are determined by work schedule templates that vary depending on the service type and partners involved in delivering the service. These templates are constructed based on the time necessary to sequentially complete each of the tasks in an order. From experience, it can be determined that an order will take a certain minimum number of days to complete ("the standard delivery time"). This is the promised delivery date which would be quoted with a standard order if the customer did not choose to expedite the order.

If the customer does not require delivery until a date after the standard delivery time (i.e., the standard delivery time may be 30 days but the customer does not require delivery until 60 days), the work schedule template can be adjusted and the start work dates for each of the tasks in the order rescheduled to optimize costs. For example, the adjusted schedule can avoid performing tasks that incur immediate costs, such as holding or purchasing network components until these components are required. If the delivery time is shorter, the work schedule template is reduced proportionally across all the critical dates. For example, if it takes 2 days to perform a task on a 30-day template, this task will be assigned 1 day on an expedited 15-day template. If intermediate critical dates for tasks are missed, the system recalculates the dates based on the remaining tasks for the order and the PDD.

The critical dates are the dates by which the different tasks have to be completed so that the multiple tasks that must be performed to complete an order by the PDD can proceed in an uninterrupted sequence. The critical dates are created using the work schedule templates described above based on the tasks in an order and the sequence of the tasks. After the start work dates are assigned, the work is distributed to the factory using a defined protocol. The work is distributed to the factory based on function, technology, service type, and sales strata.

The method of the present invention distributes work in a workcenter for a work shift. A work shift is period of time, typically a day, but other incremental time periods may be used, such as an 8-hour shift or a 40-hour work week. The work is distributed using the following rules. First, each workcenter works on the tasks that have to be completed in order to meet the critical dates for PDD. Once PDD tasks have been completed, the workcenter starts working on the tasks that have to be completed in order to meet the critical dates for ED. The workcenter stops work at this point (i.e., after ED tasks have been completed), if resources are not available to proceed beyond this point. If resources are available after the ED tasks have been completed, the workcenter starts working on the tasks that have to be completed in order to meet the critical dates for CRDD. The resources are the work force and the material assets, such as raw materials and equipment. The material assets and equipment will vary from industry to industry and depending on the tasks that are being performed.

PDD is a date promised to the customer and must be met because the customer is relying on delivery by that date. An ED is a date requested by a customer knowing that it is shorter than the work schedule templates that are normally acceptable to deliver such service. In the ED case, the company will make its best effort to meet this date to enhance its revenues and improves its customer satisfaction. If the ED is met, the customer is charged, if the ED is not met, the customer is not charged.

Some orders may take days or even weeks to complete. Each day new orders come in and the tasks for these orders must be integrated into the schedule. The work load balancing method of the present invention can be updated on a daily or hourly basis to reassign critical dates and start work dates based on different factors—such as new orders, delays in completing scheduled tasks, changes in the work force and available resources. If sufficient resources are not available to complete scheduled tasks on time, these tasks will be recalculated at the end of the day using new shortened templates and will compete for resources with the new incoming orders based on the rules for the method. For example, telecom factories tend to take about 30 days to deliver services. In other factories where work schedule templates are shorter, the critical tasks are preferably recalculated at internals shorter than daily.

After the CRDD tasks have been completed, the workcenter starts work on other work when ready tasks that have start dates that are one (1) day (or some other specified time interval) after today. The workcenter then starts work on work when ready tasks that have work start dates that are two (2) days after today, and so on, until resources are fully consumed for the day. This approach ensures that the resources in each workcenter in the factory (or a link in the chain) have enough work for the day and are working on the next set of tasks that can potentially cause jeopardy (i.e., a delay) in production.

FIG. 1 shows a flow chart for a preferred work load balancing method 10 in which a workcenter works on different tasks that are scheduled for a work shift. When an order is received from a customer, it is assigned a promised delivery date (PDD) in step 12 and one or more tasks associated with the order are identified in step 14. Some of the orders (depending on customer requirements) are then assigned either an expedited date (ED) or a customer requested delivery date (CRDD) in step 16. The work start date is then determined for each of the tasks in step 18 using work schedule templates.

After the work start date for each order is determined in step 18, an index equal to 1 is initialized in step 20. The different tasks that are performed in a workcenter are then assigned a priority. In step 22, tasks having a work start date D are assigned a first priority. A second priority is assigned to tasks having a work start date of D+n and having an ED in step 24 and third priority is assigned to tasks having a work start date of D+n and having a CRDD in step 26.

When a work shift begins in step 28 (the work shift in this case is day "D"), priority is given to tasks scheduled to start that day. PDD tasks have the highest priority and, therefore, work force and material assets are first assigned to tasks that have a PDD in step 30. If the PDD tasks with a work start date D are completed in step 32, the work force and assets are assigned to tasks that have a PDD work start date D+n and an expedited date (ED) in step 36. If these ED tasks are completed in step 38, an assessment of the resources (i.e., the available work force and material assets) is made in step 40. If sufficient resources are available, the work force and assets are assigned to tasks that have a PDD work start date D+n and a customer requested delivery dates (CRDD) in step 44. If sufficient resources are not available, work stops in step 42.

If the CRDD tasks are completed in step 46 and the work shift has ended in step 48, work stops in step 50. If the work shift has not ended in step 48, n is increased by an increment of 1 in step 52 and step 34 initiates work for day D+n. Work then begins on ED and CRDD tasks having a PDD work start date D+n in steps 36 and 44, respectively, as described above. For example, when the CRRD tasks for day D+1 have been completed in step 46 and the work shift has not ended in step 48, the workcenter begins working on ED and CRDD tasks for day D+2, following the same protocol outlined above for the day D+1 tasks. When the CRRD tasks for day D+2 are completed in step 46 and the work shift has not ended in step 48, n is once more increased by an increment of 1 in step 52 and the workcenter begins working on ED and CRDD tasks for day D+3. This continues until the shift ends in step 48 or resources are exhausted in step 40 and work stops in step 42.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method of balancing workload using critical dates, the method comprising:
   (a) assigning a promised delivery date to orders received from customers;
   (b) identifying one or more tasks associated with each of the orders;
   (c) assigning an expedited date or a customer requested date to each of the tasks of some of the orders;
   (d) determining a work start date for each of the one or more tasks in each of the orders;
   (e) initializing an index n equal to 1;
   (f) assigning a first priority to tasks having a work start date D;
   (g) assigning a second priority to tasks scheduled to begin on day D+n and having the expedited date;
   (h) assigning a third priority to tasks scheduled to begin on day D+n and having the customer requested date; and
   (i) working on tasks in priority order, wherein work on a lower priority task is not commenced until work on all tasks with higher priorities has been completed.

2. The method of balancing workload according to claim 1, further comprising:
   (j) increasing n by an increment of 1; and
   (k) repeating steps (g), (h) and (i).

3. The method of balancing workload according to claim 1, wherein the work on tasks is done during a work shift for day D, and further comprising:
   (j) increasing n by an increment of 1; and
   (k) repeating steps (g), (h), (i), (j) and (k) until the work shift for day D has ended.

4. The method of balancing workload according to claim 1, further comprising identifying, after step (b), resources needed to perform the one or more tasks associated with each of the orders.

5. The method of balancing workload according to claim 4, further comprising determining, after the tasks having the expedited date are completed, if the resources are available to complete tasks with customer requested dates and stopping work if the resources are not available.

6. The method of balancing workload according to claim 1, wherein the promised delivery date is based on a predetermined schedule for each of the one or more tasks.

7. The method of balancing workload according to claim 1, further comprising delivering the order on or before the promised delivery date.

8. The method of balancing workload according to claim 1, wherein the expedited date represents that the customer agrees to pay an additional amount for delivery prior to the promised delivery date, and wherein the customer requested date represents that the customer is willing to accept delivery of the order prior to the promised delivery date.

9. The method of balancing workload according to claim 1, wherein the work start date is the date that work on each of the one or more tasks must be started in order for the order to be completed by the promised delivery date.

10. The method of balancing workload according to claim 1, wherein the first priority tasks have the highest priority, the second priority tasks have the second highest priority and the third priority tasks have the third highest priority.

11. The method of balancing workload according to claim 1, wherein the work start date is determined based on work schedule templates and the promised delivery date for each order.

* * * * *